United States Patent [19]

Sudan et al.

[11] 4,417,004

[45] * Nov. 22, 1983

[54] PHENOL FORMALDEHYDE FOAMS

[75] Inventors: Krishan K. Sudan, Laval; Antoine Berchem, St. Hippolyte, both of Canada

[73] Assignee: Reichhold Limited, Islington, Canada

[ * ] Notice: The portion of the term of this patent subsequent to Aug. 26, 1997 has been disclaimed.

[21] Appl. No.: 100,378

[22] Filed: Dec. 5, 1979

Related U.S. Application Data

[63] Continuation-in-part of Ser. No. 919,972, Jun. 28, 1978, Pat. No. 4,219,623.

[51] Int. Cl.³ .................. C08G 8/00; C08G 14/04; C08J 9/04; C08G 65/38
[52] U.S. Cl. .................. 521/181; 521/85; 521/109; 521/128; 521/130; 521/136
[58] Field of Search ............. 521/85, 109, 128, 130, 521/136, 181

[56] References Cited

U.S. PATENT DOCUMENTS

| | | | |
|---|---|---|---|
| 2,629,698 | 2/1953 | Sterling | 521/109 |
| 2,653,139 | 9/1953 | Sterling | 521/181 |
| 3,298,973 | 1/1967 | Quarles et al. | 521/181 |
| 3,389,094 | 6/1968 | D'Alessandro | 521/181 |
| 3,484,391 | 12/1969 | Wheatley et al. | 521/130 |
| 3,740,358 | 6/1973 | Christie et al. | 521/181 |
| 3,870,661 | 3/1975 | Crook et al. | 521/130 |
| 3,907,723 | 9/1975 | Pretot | 521/181 |
| 3,915,905 | 10/1975 | Klanton | 521/181 |
| 3,953,645 | 4/1976 | Moss | 521/181 |
| 4,005,036 | 1/1977 | Stalego | 521/128 |
| 4,107,107 | 8/1978 | Mendelsohn et al. | 521/181 |
| 4,111,911 | 9/1978 | Weissenfels et al. | 521/181 |
| 4,122,045 | 10/1978 | Garrett et al. | 521/181 |
| 4,176,106 | 11/1979 | Reid et al. | 521/181 |
| 4,176,216 | 11/1979 | Reid et al. | 521/181 |
| 4,202,945 | 5/1980 | Leinhardt | 521/181 |
| 4,207,400 | 6/1980 | Dahms | 521/112 |
| 4,219,623 | 8/1980 | Sudan et al. | |

*Primary Examiner*—H. S. Cockeram
*Attorney, Agent, or Firm*—Larson and Taylor

[57] ABSTRACT

A two-part pack, and method for its preparation, from which a phenol-formaldehyde resin foam may be prepared, which system comprises in the first part of the pack a phenol-formaldehyde resin, a blowing agent which is an inert, low boiling liquid, an effective amount of a nitrogenous modifier capable of permitting dispersion of the blowing agent in the resin, and a surfactant; and in the second part of the pack an acid catalyst system dispersed in a liquid polyhydroxy compound, in a weight ratio of polyhydroxy compound to acid catalyst of at least 1:1. These two-part packs enable simpler handling and placement techniques being shelf storable, compared to the known shelf storable systems which involve three, or more, components.

14 Claims, No Drawings

PHENOL FORMALDEHYDE FOAMS

CROSS-REFERENCE TO RELATED APPLICATION

This application is a continuation-in-part of our application Ser. No. 919,972, filed June 28, 1978 and now U.S. Pat. No. 4,219,623.

BACKGROUND OF THE INVENTION (a) Field of the Invention

This invention relates to compositions from which phenol-formaldehyde resin foams may be prepared. More particularly, it relates to a two-part pack which contains, divided between the two parts of the pack, the materials required to produce a phenol-formaldehyde resin foam. Each part of the pack is stable and shelf-storable.

The major use of this foam system is an insulating material in building construction due to its low flammability and good insulation properties.

(b) Description of the Prior Art

Most foam systems, of which polyurethanes are perhaps the best known are obtained by cross linking a polymer by means of a catalyst, in the presence of a blowing agent. It is the blowing agent which forms the gas which causes the system to foam. This gas can be generated in several ways. It can be obtained chemically, but the most used method, perhaps because it is inherently the simplest, is to incorporate into the foam system a low boiling compound which is liquid under normal storage conditions for the foam components, which does not interfere with the cross linking reaction, but which vapourizes under the influence of the heat generated in that cross linking reaction. It is also necessary that the foaming agent be dispersible, preferably soluble, in one of the components used to make the foam. The commonly used blowing agents are low boiling hydrocarbons such as butane and pentane, or chlorofluorohydrocarbons, such as dichlorodifluoromethane.

Thus, it is apparent that the basic needs which must be met to get a good foam are proper cross linkable resin, a catalyst capable of cross linking that resin, and a blowing agent. It is also apparent that to prepare foam, one simply has to mix together these three reagents, together with any desired surfactants, inert dyes, fillers, plasticizers and so forth.

From the point of view of the user of foam compositions, it is desirable that the foam be obtained with the minimum of effort and without the use of complex or delicate machinery. In some cases, it is known to package the complete foam formulation in a single container, a foam being obtained when the contents are released or expelled from the container. Two examples of foams packaged in a single container are some shaving cream and fire extinguishing formulations. But for the majority of foam formulations it is not possible to place all the components in one container, for the simple reason that the cross linking reaction will rapidly ensue, leading to explosive rupture of the container.

In practice, therefore, the simplest foam formulations call for the mixing of two components, frequently in approximately equal quantities. The equipment needed to do this is well known, having been developed to handle the well known polyurethane foam formulations which call for the admixing of just two components.

Many attempts have been made to provide phenol-formaldehyde foam formulations.

In U.S. Pat. No. 2,629,698, (issued Feb. 24, 1953) R. F. Sterling describes a phenol-formaldehyde resin formulation which will generate a foam when heated. The foaming agent used is a peroxide. As a temperature of between 110° C. and 350° C. is required for this procedure, its commercial applicability is quite limited.

In U.S. Pat. No. 2,653,139, (issued Sept. 22, 1953) R. F. Sterling describes an in-situ foamable phenol-formaldehyde resin formulation. But this formulation requires the continuous mixing of at least three components, in sharply differing amounts. The apparatus required is therefore complex, requiring at least three metering and control valves.

In U.S. Pat. No. 3,298,973 (issued Jan. 17, 1967) Richard W. Quarles et al a flame-resistant and non-punking phenol-formaldehyde resin foam formulation. These foams are again prepared from a plurality of components, and the formulation is placed as soon as it is mixed. These formulations contain a minimum of four independently added components.

In U.S. Pat. No. 3,389,094 (issued June 18, 1968) William J. D'Alessandro describes a phenol-formaldehyde resin foam formulation using a polyhalogenated fluorocarbon, such as trichlorofluoromethane or trichlorotrifluoroethane, as the foaming agent. However, these formulations generally require heating to initiate the foaming reaction, and call for the simultaneous mixing of at least 4 components.

In U.S. Pat. No. 3,484,391 (issued Dec. 16, 1969) S. J. Wheatley et al describe a shock, or impact, and heat resistant phenolformaldehyde foam formulation including fiber glass. These formulations again call for mixing sequentially together, immediately before placement, of at least 4 components.

In U.S. Pat. No. 3,740,358 (issued June 19, 1973) Howard W. Christie et al describe a phenol-formaldehyde resin foam formulation similar to that described by Quarles et al. These formulations are even more complex, calling for a minimum of six components, with no recommendations for any premixing, and also require heating, typically to a temperature of from 140° F. to 180° F. for proper foam formation.

In U.S. Pat. No. 3,870,661 (issued Mar. 11, 1975) Peter J. Crook et al describe what may be termed a self catalysing phenol-formaldehyde resin foam formulation wherein the strong acid moiety required as the cross linking catalyst is directly incorporated into the resin as a pendant sulphonyl group. These formulations again require the mixing simultaneously of at least 4 components to provide a foam.

In U.S. Pat. No. 3,907,723 (issued Sept. 23, 1975) Monique Pretot describes a phenol-formaldehyde foam including resorcinol as a reagent to combat foam acidity. These formulations require the simultaneous or sequential mixing of at least 6 components to provide a foam.

In U.S. Pat. No. 3,915,905 (issued Oct. 28, 1975) Daniel Hanton describes non-burning and self-extinguishing phenol-formaldehyde resin foam formulations, utilizing a nitrogenous compound to impart the thermal characteristics. These formulations call for mixing at least four components simultaneously, and also require heating to an unspecified temperature for proper foam formation.

In U.S. Pat. No. 3,953,645 (issued Apr. 27, 1976) E. K. Moss describes phenol-formaldehyde resin foam formulations involving particular phenol-formaldehyde resins. These formulations require the simultaneous mixing of at least five components, the only premixing described being addressed to the formulation of multi-component acid catalysts.

In U.S. Pat. No. 4,122,045 (issued Oct. 24, 1978) William L. Garrett et al described a non-corrosive phenol-formaldehyde resin foam formulation. These formulations require the simultaneous mixing of at least five components, of which only some can be pre-mixed: even so, the minimum number of components appears to be four.

Through all of this prior art there runs two common threads. In none of these references is there described a formulation which pre-mixes the components required to make a phenol-formaldehyde resin foam in such a way that the final foaming step requires the admixture of only two components. Also, in none of these references is there described a formulation which permits the final foaming step to be divorced in both place and time from the described mixing steps. All of these references describe procedures in which the formulation is taken immediately right through to a placed foam.

SUMMARY OF THE INVENTION

We have now discovered that provided certain requirements are met, a two-part pack, each part of which is a stable, storable material with an adequate shelf life, can be produced, containing the phenol-formaldehyde resin and blowing agent in a first part of the pack, and the acid catalyst in a second part of the pack. These two parts of the pack on mixing, produce an acceptable cross-linked phenol-formaldehyde resin foam. Thus, we have discovered one route whereby the four necessary components-resin, surfactant, blowing agent and catalyst may be pre-packaged in two packs and yet still produce a stable, storable system with an adequate shelf life.

DESCRIPTION OF THE PREFERRED EMBODIMENTS

Thus, in a broad aspect, this invention comprises a two-part pack for providing, on mixing of the two parts of the pack a phenol-formaldehyde resin foam, which two part pack comprises, in a first part, in stable combination a phenolic resin, a blowing agent which is an inert low boiling liquid, an effective amount of a nitrogenous modifier capable of permitting dispersion of the blowing agent in the resin, and a surfactant; and in a second part, in stable combination an acid catalyst dispersed in a polyhydroxy compound, in a weight ratio of acid catalyst to polyhydroxy compound of at least 1:1.

In a first narrower aspect, this invention comprises a two part pack for providing, on mixing the two parts of the pack a phenol-formaldehyde resin foam, the two parts of which are stable and have an adequate shelf life, in which a first part comprises:

(a) a phenol-formaldehyde resin with a water content of up to 20%, which has been prepared under acid conditions, and has a pH of between 4.0 and 6.0;
(b) an inert blowing agent chosen from a hydrocarbon or a chlorofluorocarbon;
(c) a surfactant
(d) a nitrogenous modifier chosen an amine, or a polymeric amine, or a natural vegetable oil, containing amine or amino nitrogen;

and in which a second part comprises:

(i) an acid catalyst system containing a sulphuric acid, or an organic sulphonic acid together with phosphoric acid
(ii) a polyhydroxy compound chosen from ethylene glycol, propylene glycol, or glycerine, in a weight ratio of acid catalyst (i) to polyhydroxy compound (ii) of at least 1:1 excluding the phosphoric acid, and into which polyhydroxy compound the acid catalyst is dispersed.

The preparation of some suitable phenol-formaldehyde resins is described in our Canadian Pat. No. 927,041. The molar ratio of phenol to formaldehyde used is generally 1.0:1.0 to 1.0:2.0; a preferred range is 1.0:1.3 to 1.0:1.6. The resin as produced generally has a pH of 4.0 to 6.0. The resins with a pH of 4.5 to 6.0 appear to have enhanced shelf life.

The common phenol-formaldehyde resins catalysed by a mildly acidic salt and/or a base are also quite suitable to prepare a two part pack, being compatible with the other factors employed. An amine used as the nitrogenous component of the foam system can itself be employed to prepare the resin which becomes later a part of the system.

The following examples illustrate the procedures of preparing various phenol-formaldehyde resins:

(A) 1092 grams of 44% aqueous solution of formaldehyde was loaded into a glass reactor equipped with suitable means of agitation, vapour condensation, and vacuum distillation. The formaldehyde solution was adjusted to pH 8.0-8.4 with 10% solution of sodium hydroxide. Now 940 grams of phenol were added. The batch temperature was carefully raised to atmospheric reflux at 99°-101° C. over 30-40 minutes. The batch was held at atmospheric reflux until a cloud point (cool 5 ml. of batch sample in a test tube until a turbidity or a cloud is visible) of 50°-55° C. was achieved. At this stage, the batch was vacuum distilled to a Gardner-Holdt viscosity of V-W, and cooled. The final pH of the resin was 7.4.

(B) 955 grams of 44% formaldehyde solution was loaded into a reactor as described in Example (A), followed by 940 grams of phenol and 18.8 grams of zinc acetate. The batch was held at atmospheric reflux until a cloud point of 75°-80° C. was achieved. At this stage the batch was vacuum distilled to a Gardner-Holdt viscosity of V-W and cooled. The final pH of the resin was 5.1.

(C) 1024 grams of 44% formaldehyde solution was loaded into a reactor as described in Example (A), followed by 940 grams of phenol and 37.6 grams of triethanolamine. The batch was held at atmospheric reflux until a cloud point of 65°-70° C. was achieved, and then vacuum distilled to a Gardner-Holdt viscosity of V-W. The final pH of the batch was 7.6.

(D) 1382.5 grams of 44% formaldehyde solution was loaded into a reactor, as described in Example (A), followed by 47 grams of triethanolamine and 77.5 grams of urea. The batch was slowly heated to atmospheric reflux and held at atmospheric reflux for 10 minutes. The batch was cooled to 85°-90° C. and 1175 grams of phenol were loaded. The batch was heated again to atmospheric reflux and held at atmospheric reflux until a cloud point of 45°-50° C. was achieved. At this stage, the batch was vacuum distilled to Gardner-Holdt viscosity of V-W and cooled. The final pH of the batch was 7.4.

(E) 1182 grams of 44% formaldehyde solution was loaded into a reactor, as described in Example (A), followed by 32 grams of triethanolamine and 109 grams of melamine. The batch was heated to atmospheric reflux and held for 10 minutes. The batch was cooled to 85°-90° C. and 1005 grams of phenol was loaded. The batch was heated back to atmospheric reflux and held at atmospheric reflux until a cloud point of 25°-30° C. was achieved. At this cloud point, the batch was vacuum distilled to a Gardner-Holdt viscosity of V-W. The final pH of the batch was 7.4.

(F) 1365 grams of 44% formaldehyde solution was adjusted with triethanolamine to pH 7.6-7.8 and added slowly to 600 grams of urea in a reactor. The batch was heated slowly to 93°-95° C. and held until a cloud point of 40°-45° C. was achieved. At the cloud point, the pH of the batch was brought down in the acid stage to pH 5.0-5.2 with dilute formic acid solution. The batch was held at 90°-95° C. and pH 5.0-5.2 until a Gardner-Holdt viscosity of B-C. Immediately, the pH was raised to 7.0-7.2 with triethanolamine. Another 300 grams of urea was added to the batch and the batch was vacuum distilled to a Gardner-Holdt viscosity of L-M. The final pH of the batch was 7.4.

The above examples (A), (B), and (C) illustrate common phenol-formaldehyde resins suitable for the phenolic foam of this invention. The examples (D) and (E) illustrate also a phenol-formaldehyde resin which is modified with amino resin co-condensed in one step. The example (F) represents a typical urea-formaldehyde amino resin which can be used to modify the phenol-formaldehyde resin for the foam. All the above resin systems represent a non-volatile content of approximately 70% on weight basis.

The term "phenol" can include not only substantially pure phenol, but also technical grade phenols, and cresols with a high meta- and para-cresol content. A preferred phenol composition is one with a boiling range of 180°-200° C., containing not more than 15% by weight of ortho-cresol plus xylenols.

The formaldehyde generally is substantially pure, and derives from any of the industrially available sources, such as formalin, para-formaldehyde, etc.

The blowing agent used is an inert, low boiling compound which vapourises under the influence of the heat generated in the cross linking reaction. Generally, this will involve temperatures less than 100° C. The preferred blowing agent is dichlorodifluoromethane.

The surfactant can be anionic, cationic, or nonionic. The only restriction of any significance is the obvious one that it must not interfere with the foaming and cross linking processes. A suitable preferred one is a silicone based material, for example Dow Corning 190 (Trade Mark).

The modifier whereby the four essential parts of the resin component are rendered homogeneous is generally an amino, or nitrogenous compound. The precise nature of this compound will depend, in large part, upon the purpose to which the foam is to be put: this facet of this invention is discussed further, below. Typical materials which have been found to work include comparatively low vapour pressure amines such as diethanolamine; triethanolamine; diethanoltriamine; triethanoltetramine; piperazine; hexamethylene tetramine; tall oil; amino-group containing polymers of formaldehyde with urea, melamine, or guanidine and mixtures of these.

It is not known how, or even why, these nitrogeneous materials should function in the way they do, especially as some of them, for example tall oil, do not contain much nitrogen. Nevertheless their effect is to provide a homogeneous resin containing system, when the components thereof are blended. These resin mixtures with surfactant, blowing agent and nitrogenous modifier also have the peculiar property that they require an "aging" period before use. By this it is meant that after blending together the four materials making up the phenol-formaldehyde component, the surfactant, modifier, and blowing agent being added in that order to the resin, it should be stored for a period of time before use to obtain a good uniform foam. The time required seems to depend upon a number of factors, and can be as low as 4 hours. At normal ambient temperatures of about 60° F./15° C. storage overnight appears to be sufficient. During storage, the component is preferably held in a sealed container, primarily to minimize loss of blowing agent.

When ready for use, the resin component comprising a first part of the two-part pack is a homogeneous viscous liquid (unless dyes, fillers, etc. have been added to it).

The second part of the two-part pack used in preparing our foams is the acid catalyst. This comprises a mixture of acids dispersed in a polyhydroxy compound. The polyhydroxy compound can be chosen from a wide range. Readily available ones are ethylene glycol, propylene glycol, and glycerine. We prefer to use propylene glycol, although other polyhydroxy compounds are also suitable.

The acid catalyst preferably contains sulphuric acid or an organic sulphonic acid together with phosphoric acid. Suitable organic sulphonic acids are methane sulphonic acid, benzene sulphonic acid, or para-toluene sulphonic acid. No precise preferred catalyst can be given. The catalyst formulation used will be determined by the nature of the foam being made, for example a fast-forming foam, or a slow-forming foam.

The ratio of acid catalyst to glycol used is variable. The minimum is equal weights of sulphuric acid and glycol. How much more glycol is used depends on the desired foam qualities, since the glycol will act as a plasticizer to soften the foam. But there must be present a minimum amount as otherwise it becomes exceedingly difficult to obtain adequate dispersion of the catalyst into the phenol-formaldehyde resin component. If the glycol is also being used as a plasticizer, at least some of the amount used can be incorporated into the resin component without detriment thereto, provided the required minimum is retained in the acid catalyst component.

The catalyst component is prepared by mixing or blending together the acids and the glycol, and allowing the mixture to cool, generally to provide a viscous oil. This viscous mixture has the added advantage that when the two components of the foam are mixed, a blend is obtained with better body and flow properties than many known phenol-formaldehyde resin foam systems. This is of considerable practical assistance in placing the material prior to its foaming.

Typical examples of the catalyst composition are:

CATALYST—1

100 parts by weight of conc. sulphuric acid
100 parts by weight of conc. phosphoric acid
100 parts by weight of propylene glycol

CATALYST—2

100 parts by weight of paratoluene sulphonic acid
100 parts by weight of conc. phosphoric acid
50 parts by weight of propylene glycol The acids are mixed first and placed in a cooling bath. Slowly, the glycol is added under constant agitation of the components. The resultant component mixture would be a somewhat viscous liquid. The Gardner-Holdt viscosity of the mixture was C-D.

The above mentioned typical catalyst formulation will be used in the preparation of the actual foams of the invention. These merely represent two convenient catalysts: many other are possible.

One other variable needs consideration in respect of each of the two parts which make up the two part pack of this invention. This is the matter of the size of each of the containers used to package each of the two parts. So far as we are aware, there is no limitation known of any relevance, apart from the obvious one of the physical availability of the necessary containers. Thus the containers can range from as small as those used for two-part epoxy cements when sold for home use, which are tubes like toothpaste tubes but generally a little smaller, up to railway tank cars. The controlling factors simply are two: the quantity of foam it is desired to generate, and accessibility for the container chosen to the place where it is desired to mix and place the foam. For household use, e.g. in repairing household insulation, small size containers are clearly desirable. For larger operations, e.g. thermally insulating a large building, larger containers are desirable, up to tank cars in pairs depending on the quantities needed.

The following foams were prepared based upon the resins of examples (A), (B), (C), (D), (E) and (F);

| EXAMPLE RESINS | A | B | C | D | E | B | B | B |
|---|---|---|---|---|---|---|---|---|
| Phenol-formaldehyde | 100 | 100 | 100 | 100 | 100 | 100 | 100 | 100 |
| Surfactant (Dow-190) | 2 | 2 | 2 | 2 | 2 | 2 | 2 | 2 |
| Triethanolamine | 2 | 2 | — | 2 | 2 | 2 | 2 | 2 |
| Example (F) | 10 | 10 | 10 | — | — | — | — | — |
| Reichhold's IB-013* | — | — | — | — | — | 10 | — | 5 |
| Reichhold's IB-603** | — | — | — | — | — | — | 10 | 5 |
| Dichlorodifluoromethane | 6 | 6 | 6 | 6 | 6 | 6 | 6 | 6 |
| Viscosity (cps.) | 850 | 940 | 900 | 750 | 800 | 1050 | 950 | 1000 |
| pH | 8.2 | 8.1 | 8.2 | 7.6 | 7.5 | 7.5 | 7.7 | 7.6 |

*a powdered urea/formaldehyde resin
**a powdered melamine/formaldehyde resin

| | PROPERTIES OF THE ABOVE FOAM RESIN RESIN: CATALYST NO. 1, RATIO OF 2:1 | | | | | | | |
|---|---|---|---|---|---|---|---|---|
| EXAMPLE RESINS | A | B | C | D | E | B | B | B |
| Cream Time (sec.) | 10 | 15 | 12 | 14 | 8 | 15 | 9 | 13 |
| Rise Time (sec.) | 105 | 120 | 120 | 100 | 100 | 100 | 110 | 100 |
| Tack Free Time (sec.) | Instantly After Rise Time | | | | | | | |
| Peak Exotherm °C. | 82 | 80 | 76 | 90 | 82 | 80 | 84 | 82 |
| Density lbs/cu. ft. | 2.0 | 2.2 | 1.9 | 2.1 | 2.4 | 2.8 | 2.9 | 2.8 |
| Compressive Strength psi - ASTM D-1621 | | | | | | | | |
| Parallel to rise | 18 | 24 | 17 | 19 | 28 | 26 | 31 | 34 |
| Perpendicular to rise | 16 | 20 | 14 | 16 | 21 | 20 | 27 | 26 |
| Tensile Strength psi | | | | | | | | |
| Parallel to rise ASTM D-1623 | — | 41.6 | — | — | — | — | — | — |
| Humid Aging ASTM D-2126 | | | | | | | | |
| Weight Change % | — | +38.4 | — | — | — | — | — | — |
| Volume Change % | — | +8.5 | — | — | — | — | — | — |
| Flammability ASTM D-1622 | | | | | | | | |
| Self-extinguishing | — | Yes | — | — | — | — | — | — |
| Burnt Extent inches | — | 1.6 | — | — | — | — | — | — |
| Heat Aging (% W. Loss) ASTM D-2126 | | | | | | | | |
| 2 days @ 400° F. | — | −25.0 | — | — | — | — | — | — |
| 2 days @ 350° F. | — | −22.52 | — | — | — | — | — | — |
| 2 days @ 300° F. | — | −20.6 | — | — | — | — | — | — |
| 2 days @ 250° F. | — | −17.3 | — | — | — | — | — | — |
| 7 days @ 250° F. | — | −17.6 | — | — | — | — | — | — |
| K-factor, Btu in./ft.$^2$ °F., ASTM D-518 | — | 0.198 | — | — | — | — | — | — |

| | PROPERTIES OF THE ABOVE FOAM RESIN RESIN: CATALYST NO. 2 RATIO OF 2:1 | | | | | | | |
|---|---|---|---|---|---|---|---|---|
| EXAMPLE RESINS | A | B | C | D | E | B | B | B |
| Cream Time (sec.) | 22 | 21 | 28 | 22 | 20 | 18 | 22 | 24 |
| Rise Time (sec.) | 110 | 200 | 205 | 200 | 170 | 230 | 206 | 186 |
| Tack Free Time (sec) | Instantly after Rise Time | | | | | | | |
| Peak Exotherm °C. | 67 | 64 | 60 | 70 | 68 | 62 | 65 | 66 |
| Density lbs/cu. ft. | 2.5 | 3.2 | 3.0 | 4.2 | 3.6 | 3.2 | 3.0 | 3.6 |
| Compressive Strength psi - | | | | | | | | |

PROPERTIES OF THE ABOVE FOAM RESIN
RESIN: CATALYST NO. 2 RATIO OF 2:1

| EXAMPLE RESINS | A | B | C | D | E | B | B | B |
|---|---|---|---|---|---|---|---|---|
| Parallel to rise | 38 | 39 | 42 | 36 | 39 | 38 | 32 | 38 |
| Perpendicular to rise | 26 | 31 | 32 | 28 | 32 | 30 | 28 | 22 |

PHYSICAL PROPERTIES OF THE PHENOLIC FOAM
(TESTED ON RESIN B) AND CATALYST NO. 2

| METHOD | PROPERTIES | RANGE |
|---|---|---|
| ASTM D-1622 | Density, lbs./ft.$^3$ | 2-4 |
| ASTM C-518 | K-Factor, Btu in./ft.$^2$, °F. | 0.2-0.25 |
| ASTM D-2126 | Dimensional Stability, 158° F./95% RH, % Volume Change (1-7 days) | 8.0-10.0 |
| ASTM D-1621 | Compressive Strength, p.s.i. | |
| | Parallel to rise | 20-40 |
| | Perpendicular to rise | 15-30 |
| ASTM D-1623 | Tensile Strength, p.s.i. | |
| | Parallel to rise | 20-50 |
| ASTM D-2126 | Heat Aging % Weight Loss | |
| | 2 days @ 400° F. | −15−−25 |
| | 2 days @ 350° F. | −10−−20 |
| | 2 days @ 300° F. | −10−−20 |
| | 2 days @ 250° F. | −10−−20 |
| | 7 days @ 250° F. | −10−−20 |
| ASTM D-1622 | Flammability - Self Extinguishing | Yes |
| | Burnt Extent (inches) | 1.0-2.0 |

It was mentioned earlier that the choice of amine, or amine group containing, component is very wide. The amine component can be utilized to serve diverse requirements, in addition to its use to provide a homogeneous storage-stable phenol-formaldehyde resin component for the foam. Choice of amine material is based on the properties desired in the final foam, and its manner of placement.

In terms of properties, these foams are generally used as thermal insulators, and therefore their burning properties are an important consideration in formulation. It is therefore not desirable to use an amine which is volatile in an insulating foam. Reference to the amines listed above will show that they are all essentially non-volatile. A volatile amine could be used where the attendant fire hazard is of no importance. It has also been found that the presence of these amino compounds in the foams has a marked "antipunking" effect, which, in terms of the properties of foam used as thermal insulators, is highly desirable.

The amine material can also be chosen to assist with foam placement. For a poured foam, for example one pumped into a gap from the top, an amine such as triethanolamine is satisfactory. But phenol-formaldehyde resin foams do not generally cure very quickly at lower temperature and pH, and thus their application by spraying to surfaces such as walls and ceilings has been limited. This invention permits the use of amino resin material derived from urea, melamine or guanadine or mixtures thereof as the amino material. This polymer serves the dual function of providing both a stable, homogeneous resin system, and, on spraying, a rapidly curing skeleton which holds the phenol-formaldehyde resin in place for sufficient time to allow its slower curing processes to go on without requiring excessive acidity and heat.

In the example shown in the table, the usage of amino resins has been illustrated in combination with other amines and essentially phenol-formaldehyde resins.

"Punking" is a phenomenon associated with charring. It is the propagation of charring randomly through a material, often along a path of a limited cross sectional area. Thus, although the surface of a piece of foam may have ceased both to burn and to glow, punking can still be going on inside the foam, which can give rise to the ignition of a flammable material in contact with the foam at a point remote from the original source of heat.

A method of checking whether a foam punks or not was devised in our laboratory. A cube of foam having a four inch side was cut and a 2 inch × 2 inch round mouse hole was dug out on one face. A hand-held propane flame was used to burn the hole to a glow for 2 minutes. The burnt piece was left on the bench and observed to see if the foam continued to burn through by itself. If no autogeneous burn-through occurred, the foam was declared as a "non-punking" foam. All of the above exemplified resins satisfied this test.

The amounts of the various components used in a foam according to this invention will be determined by the properties desired in the final foam after placement. Such a foam may also include any of the conventional dyes, fillers and so forth that may be required, for example for aesthetic reasons. These amounts of components can easily be decided by way of a few small scale experiments. Broadly, choice from within the following ranges of the various components will generally be found to provide an acceptable placed foam.

The Resin Part of the Pack

| | |
|---|---|
| Resin | 100 parts by weight |
| Surfactant | 0.1 to 0.4 parts by weight |
| Amino material | 1 to 20 parts by weight |
| Preferred Amino material range | 4 to 10 parts by weight |
| Blowing agent* | 1 to 20 parts by weight |
| Polyhydroxy compound** | 0 to 25 parts by weight |

*The amount used is largely determined by the desired foam density plus some allowance for handling losses, etc.
**See earlier discussion concerning incorporation of this into the resin component excluding any phosphoric acid.

Ratio of Resin to Catalyst

This ratio is determined by the acid requirements of the resin needed in order to obtain an acceptable degree of cross linking. Thus generally a weight ratio of resin to catalyst in the range of from about 4:1 to 1:1 could be found suitable but these limits are not precise.

Thus in deciding upon the precise values of the various variable parameters involved in preparing foams according to this invention the major determining factor is ensuring that the foam when placed has the properties desired of it.

Some further examples of foams are as follows.

EXAMPLE 1

| | Resin Component | |
|---|---|---|
| A. | Resole phenol-formaldehyde resin | 200 parts |
| B. | Dow Corning Silicone 190 surfactant | 4 parts |
| C. | Ethylene glycol | 50 parts |
| D. | Hexamethylene tetramine | 5 parts |
| E. | Urea/formaldehyde resin powder | 5 parts |
| F. | Dichlorodifluoromethane (Freon 11) | 20 parts |
| | Catalyst Component | |
| | Sulphuric acid (technical grade, concentrated) | 100 parts |

-continued

| | |
|---|---|
| Phosphoric acid (85%, technical grade) | 100 parts |
| Propylene glycol | 100 parts |

Procedure

Components A to E of the resin were blended sequentially in the order given, and mixed until clear. The mix was cooled to about 20° C., and the blowing agent added. The vessel was then sealed and held under autogenous pressure with cooling for 24 hours.

Foam Preparation

Resin and catalyst components mixed in equal parts by weight; foam density was 0.04 gm/c. c. approx.

The resin A used in this example is a zinc acetate catalysed material produced according to the procedures in Canadian Pat. No. 927,041, with a phenol/formaldehyde ratio of 1:1.39.

EXAMPLE 2

| | | |
|---|---|---|
| Resin Component | | |
| A. | Resole phenol-formaldehyde resin | 200 parts |
| B. | Dow Corning Silicone 190 surfactant | 4 parts |
| C. | Hexamethylene tetramine | 15 parts |
| D. | Dichlorodifluoromethane | 10 parts |
| Catalyst Component | | |
| | Sulphuric acid (technical grade, concentrated) | 125 parts |
| | Phosphoric acid (85%, technical grade) | 125 parts |
| | Propylene glycol | 100 parts |

Procedure and Foam Preparation were as in Example 1. The resole resin used is also the same. Foam density: 0.04 gm/c. c. approx.

EXAMPLE 3

| | | |
|---|---|---|
| Resin Component | | |
| A. | Resole phenol-formaldehyde resin | 500 parts |
| B. | Dow Corning Surfactant 190 | 16 parts |
| C. | Hexamethylene tetramine | 10 parts |
| D. | Urea/formaldehyde resin powder | 20 parts |
| E. | Paratoluene sulphonic acid | 0.8 parts |
| F. | Dichlorodifluoromethane | 80 parts |
| Catalyst Component | | |
| | Sulphuric acid (technical grade, concentrated) | 300 parts |
| | Phosphoric acid (85%, technical grade) | 300 parts |
| | Propylene glycol | 300 parts |

Procedure and Foam Preparation were as in Example 1. The resole resin used is also the same as that in Example 1. Foam density: 0.04 gm/c. c. approx.

What is claimed is:

1. A two container pack for providing, on mixing of the two parts of the pack, a phenol-formaldehyde resin foam, which two part pack comprises:
   in a first part, in stable combination, a phenolic resin, a blowing agent which is an inert low boiling liquid, an effective amount of a nitrogenous modifier capable of permitting dispersion of the blowing agent in the resin, and a surfactant; and
   in a second container in stable combination an acid catalyst composition dispersed in a polyhydroxy compound, in a weight ratio of acid catalyst to polyhydroxy compound of at least 1:1.

2. A two part pack according to claim 1 which comprises:
   in a first part in stable combination,
   (a) a resole phenol-formaldehyde resin with a water content of up to 20%, which has been prepared under acid conditions, and has a pH of between 4.0 and 6.0;
   (b) an inert blowing agent chosen from a hydrocarbon or a chlorofluorohydrocarbon;
   (c) a surfactant; and
   (d) a nitrogeneous modifier chosen from an amine, a polymeric amine, or a natural vegetable oil containing amine or amino nitrogen; and in a second part in stable combination;
   (i) an acid catalyst composition containing sulphuric acid or an organic sulphonic acid together with phosphoric acid; and
   (ii) a polyhydroxy compound chosen from ethylene glycol, propylene glycol and glycerine in a weight ratio of acid catalyst (i) to polyhydroxy compound (ii) of at least 1:1. excluding the phosphoric acid, and into which polyhydroxy compound (ii) the acid catalyst (i) is dispersed.

3. A two part pack according to claim 1 wherein the phenol-formaldehyde resin used in the first part of the pack has a pH of from 4.5 to 6.0.

4. A two part pack according to claims 1 or 2 wherein the blowing agent used in the first part of the pack is dichlorodifluoromethane.

5. A two part pack according to claims 1 or 2 wherein the surfactant used in the first part of the pack is a silicone-based material.

6. A two part pack according to claims 1 or 2 wherein the organic sulphonic acid used in the second part of the pack is chosen from one or more of methane sulphonic acid, benzene sulphonic acid, and para-toluene sulphonic acid.

7. A two part pack according to claims 1 or 2 wherein the nitrogenous modifier used in the first part of the pack is chosen from at least one of diethanolamine, triethanolamine, diethanoltriamine, triethanoltetramine, piperazine, hexamethylene tetramine, tall oil, and amino group containing polymers of formaldehyde with urea, melamine, or guanidine.

8. A two part pack according to claims 1 or 2 wherein the acid catalyst system used in the second part of the pack contains 1 part by weight sulphuric acid or organic sulphonic acid, together with zero to 1 part by weight phosphoric acid, provided that the weight ratio of phosphoric acid to sulphuric acid or organic sulphonic acid does not exceed 1:1.

9. A two part pack according to claims 1 or 2 wherein the first part of the pack contains in parts by weight:

| | |
|---|---|
| phenol-formaldehyde resin: | 100 parts; |
| surfactant: | 0.1 to 4.0 parts; |
| nitrogenous modifier and | 1 to 20 parts; |
| blowing agent: | 1 to 20 parts. |

10. A two part pack according to claims 1 or 2 wherein the second part of the pack contains in parts by weight:

| | |
|---|---|
| sulphuric acid | 1 part |
| 85% phosphoric acid | 1 part |
| propylene glycol | at least 0.5 parts. |

11. A two part pack according to claims 1 or 2 wherein the first part of the pack contains a phenol-formaldehyde resin prepared from substantially pure phenol.

12. A two part pack according to claims 1 or 2 wherein the first part of the pack contains a phenol-formaldehyde resin prepared from technical grade phenol.

13. A two part pack according to claims 1 or 2 wherein the first part of the pack contains a phenol-formaldehyde resin prepared from a technical grade phenol having a boiling range of 180° C. to 200° C. and containing not more than 15% by weight ortho-cresol plus xylenols.

14. A two part pack according to claims 1 or 2 wherein the first part of the pack contains a polyhydroxy compound which may be the same as or different to the polyhydroxy-compound used in the second part of the pack.

* * * * *